Feb. 6, 1945.  H. W. HEM  2,368,986
WEIGHING SCALE
Filed July 10, 1942
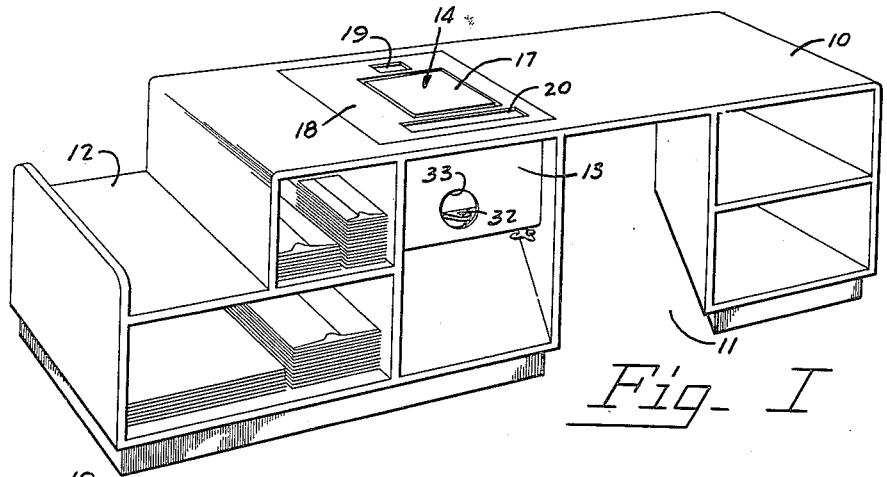
Fig. I
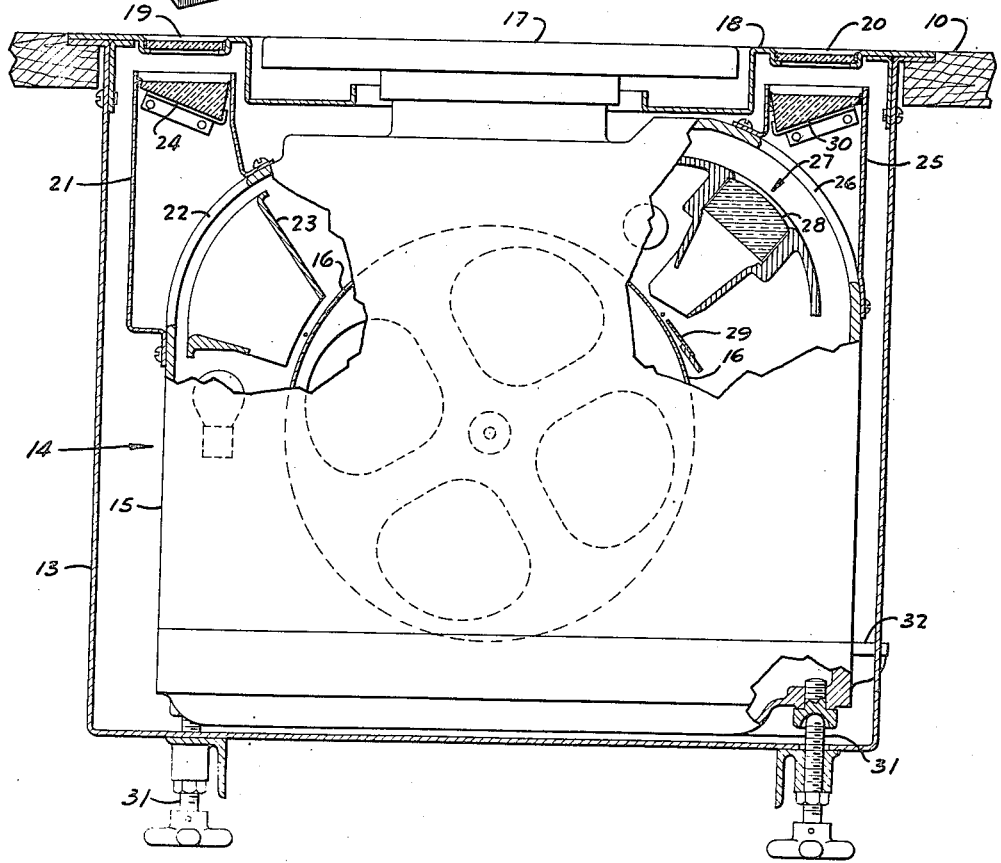
Fig. II
Halvor W. Hem
INVENTOR
BY Marshall & Marshall
ATTORNEYS Patented Feb. 6, 1945

2,368,986

UNITED STATES PATENT OFFICE 2,368,986

WEIGHING SCALE

Halvor W. Hem, Toledo, Ohio, assignor to Toledo Scale Company, Toledo, Ohio, a corporation of New Jersey Application July 10, 1942, Serial No. 450,476

1 Claim. (Cl. 88—1)

This invention relates to weighing scales, and more particularly to indicating means for permitting a weighing scale to be countersunk in a retail store counter while still providing visible indication of weight to both the customer and the merchant.

In the so-called super markets after the customers have served themselves and assembled their purchases in a wheeled cart, the merchandise is checked at a checking counter placed near the exit from the store. These counters are in general of two types. The first is a counter which is made very low so that the clerk checking the merchandise can reach over the counter to remove it from the cart and also can see the customer's hands and pockets to prevent "shoplifting." The second type of checking counter is high and usually has a tunnel through which the cart is pushed so that the clerk behind the counter can easily unload it. In either instance, and particularly in the latter, space on the checking counter is at a premium since the merchandise must be placed thereon and moved from one side to the other as its value is entered in a ticket-printing cash register. Because of the crowded conditions on the checking counter, many super markets do not have checking scales located thereon and therefore merchandise which is purchased by weight, such as meat and produce, is usually weighed and priced by clerks in those departments. This requires the employment of several clerks in addition to the checking and stock maintenance clerks and substantially increases the cost of operation.

It is an object of this invention to provide a weighing scale which can be set in the "checking counter" and thus not obstruct the free space on the top of the counter.

It is another object of this invention to provide indicating means for a weighing scale which is mounted with its load receiving platter on the same level as a counter top.

It is still another object of this invention to provide a weighing scale which may be employed in checking operations and which will not occupy space on top of the counter or obstruct the checking clerk's vision.

More specific objects and advantages are apparent from the description, in which reference is had to the accompanying drawing illustrating a preferred form of weighing scale indicator embodying the invention.

In the drawing:

Fig. I is a perspective view of a checking counter in which a weighing scale embodying the invention is shown installed.

Fig. II is a view, partly in elevation and partly in section, of a weighing scale embodying the invention.

The specific drawing and the specific description that follow merely disclose and illustrate the invention and are not intended to impose limitations upon the claim.

A checking counter 10, which may have a tunnel 11 through which carts may be pushed, and a loading shelf 12 on which bags of merchandise may be packed, has a well 13 in which a weighing scale 14 may be located. The weighing scale 14 is preferably of the box type having a housing 15, which encloses the weighing mechanism and an indicating chart 16, and a platter 17 mounted above the housing 15. The well 13 is of such depth that the surface of the platter 17 is flush with the surface of the checking counter 10. The well 13 has a top plate 18, which is shaped to extend beneath the edges of the platter 17 to prevent the ingress of dust and food particles into the well 13, and which has two windowed apertures 19 and 20.

The aperture 19 is located above the upper end of a periscope 21 which is secured to the exterior of the housing 15 on the customer's side of the weighing scale 14. The lower end of the periscope 21 extends over an opening 22 in the housing 15 which is in line with the outer end of a sighting funnel 23 located over the peripheral area on the cylindrical chart 16 where the customer's weight indicia is printed.

A prism 24 is mounted in the upper end of the periscope 21. The prism 24 bends the sighting line into the funnel 23 so that the rays carrying the image of the indicia on the chart 16 emanate vertically from the aperture 19.

A second periscope 25 is fastened to the exterior of the housing 15 on the merchant's side of the weighing scale. The lower end of the periscope 25 covers an opening 26 in the housing 15 which is in line with a lens cell 27 extending laterally along the merchant's side of the chart 16. A lens 28 magnifies the indicia on a price-indicia member 29 and the amount indicia carried by the chart 16. A prism 30, mounted in the upper end of the periscope 25, bends the sighting line of the amount and price indicia so that it emanates from the aperture 20 in a vertical direction.

The weighing scale is mounted in the well 13 on vertically adjustable studs 31 so that its condition of level can be adjusted with reference to a spirit level 32 which is visible through an opening 33 in the side of the well 13.

Thus both the customer and the merchant are afforded a complete indication of the weight of various types of merchandise and the proper charge therefore can be checked at the checking counter without occupying any of the space on the checking counter or obscuring the checker's view over the counter.

The embodiment of the invention that has been disclosed may be modified to meet various requirements.

Having described the invention I claim:

In a device of the class described, in combination, a counter, a box scale having a load receiver above its counterbalancing and indicating mechanism, a well in said counter in which said scale is located with its load receiver flush with said counter, a cover for said well, said cover extending beneath the load receiver and having a pair of glazed apertures adjacent the load receiver, indication viewing apertures in the upper sides of said box scale positioned generally beneath the apertures of said cover, and optical prisms interposed between said apertures in said cover and scale to make the indications of said scale visible through the apertures of said cover.

HALVOR W. HEM.